ABRAM HEULINGS.
Improvement in Potato-Diggers.
No. 127,345. Patented May 28, 1872.
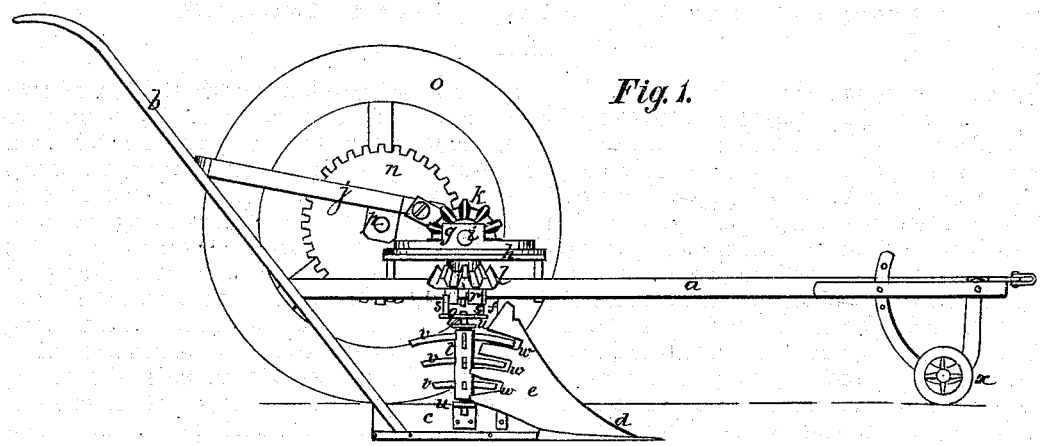
Fig. 1.
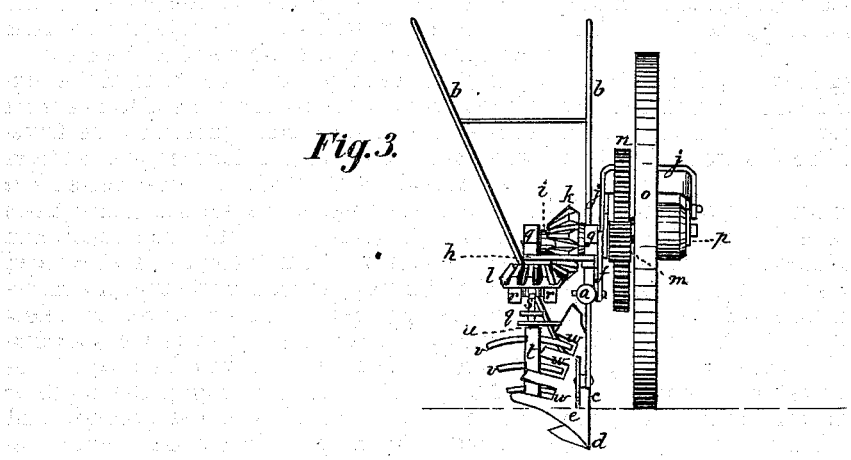
Fig. 3.
Fig. 2
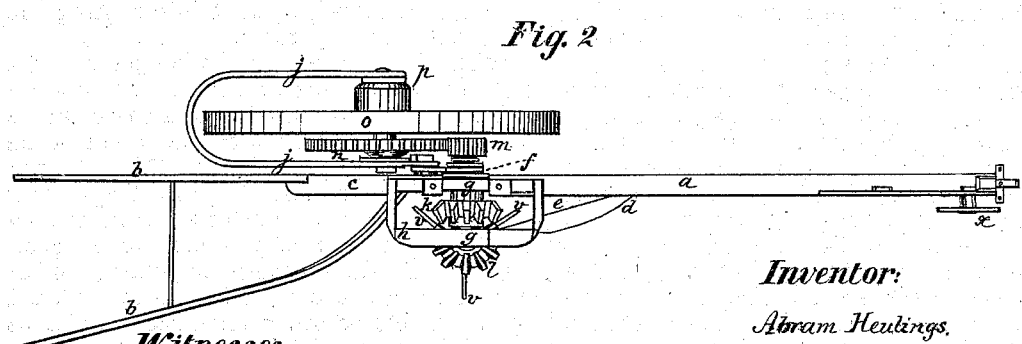
Witnesses:
Inventor:
Abram Heulings.
by Johnson, Klaucke & Co.
his Attorneys.

No. 127,345

UNITED STATES PATENT OFFICE.

ABRAM HEULINGS, OF PHILADELPHIA, PENNSYLVANIA.

IMPROVEMENT IN POTATO-DIGGERS.

Specification forming part of Letters Patent No. 127,345, dated May 28, 1872.

*To all whom it may concern:*

Be it known that I, ABRAM HEULINGS, of the city of Philadelphia, in the State of Pennsylvania, have invented certain new and useful Improvements in Potato-Diggers, of which the following is a specification:

My invention relates to that class of potato-diggers in which a plowshare is used to uncover and bring the potatoes to the surface of the ground; and my said invention consists of a potato-digger in which the drive-wheel has its bearings in a yoke, so hung to the main frame as to allow the drive-wheel to rise and fall with the unevenness of the ground without changing the position of the plow and without interfering with the continuous operation of the gear-wheels, which operate a vertical armed separator.

In the accompanying drawing, Figure 1 represents the mold-board side elevation of my improved potato-digger. Fig. 2 represents a plan or top view; and Fig. 3, a front elevation of the same.

To the plow-beam $a$ are secured handles $b$, which are at their lower ends connected to the land-side $c$ of the mold-board, which is secured to the beam $a$ in any suitable manner. The point $d$ and mold-board $e$ form the plow, by means of which the potato-hills are overturned and the potatoes thrown onto the mold-board. To the rear of the plowshare a standard, $f$, rises from the beam $a$; and through suitable bearings $g$, secured on brace-pieces $h$, a shaft, $i$, passes, on which, just outside of the standard $f$, the end of the inner arm of a yoke, $j$, has a free turning movement, and which carries between the bearings $g$ a beveled cog-wheel, $k$, gearing with a corresponding beveled cog-wheel, $l$, which revolves upon a stud suspended from the brace-piece $h$ under the center of the outer bearing $g$. The shaft $i$ carries on its inner end, and outside of the end of the inner arm of the yoke $j$, a cog-wheel, $m$, which gears with the larger toothed wheel $n$, formed on and concentric with the drive-wheel $o$, which latter has its bearings in suitable pieces $p$, one of which is formed on the end of the outer arm, and the other on a corresponding part of the inner arm of the yoke $j$, so that the drive-wheel $o$ revolves upon its axis within the yoke $j$, and also is free to rise and fall upon its bearing on the short cross-shaft. From the under side of the horizontal beveled cog-wheel $l$ depend two projections or arms, $r$, which, by coming in contact with two upright projections, $s$, on a cross-piece, $q$, secured to the upper end of the reel-shaft $t$, revolve the latter when advancing, but allow it to stand still in drawing the plow backward, to free it from obstructions. This shaft $t$ has its bearings in arms $u$, the upper one extending from the beam $a$ and the lower one from the land-side $c$; and this shaft, being enlarged between the said bearings so as to form a hub, carries several sets of arms, $v$, which, in revolving, pass through corresponding slots $w$, seizing the earth and potatoes and throwing them therefrom. The front end of the beam $a$ is supported in the usual manner by a wheel, $x$, which can be adjusted in order to depress or elevate the point of the plow.

It will be readily understood that, as the cog-pinion $m$ is always at the same distance from the center of the toothed wheel $n$ on the drive-wheel $o$, and as the separator $t$ is revolved from the drive-wheel through the cog-wheels $l\ k\ m$ and toothed wheel $n$, the several gear-wheels will always be in gear with each other, and the separator will be uninterruptedly revolved when advancing, no matter whether the drive-wheel is elevated above or depressed below the plow; and thus the drive-wheel may accommodate itself automatically to the inequalities of the ground without changing the depth or the position of the plow in the ground; and the plow also may be easily and readily elevated to avoid stumps or stones, or depressed deeper, if required, without interrupting the operation of the separator.

When the potato-digger is in operation the plow opens the hills and forces the potatoes and dirt upwardly onto the mold-board, where they come into contact with the arms $v$ of the separator, which pass through the slots $w$ in the mold-board, and which throw the potatoes and dirt to one side, scattering them as they are thrown, and thereby separating the potatoes from the dirt, causing the potatoes to fall on the surface of the ground, ready to be picked up in baskets or other receptacles and to be loaded in wagons. When the work is done, and in going home, the point of the plow may be raised by the handles $b$ above the ground, and supported upon the heel in the usual manner.

The arm of the yoke to which the pinion is attached is pointed and provided with a slot, to allow the pinion to be adjusted, when required, so as to keep it always in gear with the drive-wheel.

The special object of having the spindle of the separator independent of the driving-gear is to allow the plow to be drawn back to detach it from an obstruction without turning the separator-arms backward, and thereby prevent the crushing of the potatoes.

Having described my invention, I claim—

1. In a potato-digger having an armed moldboard and revolving armed separator, arranged and operating as described, I claim the drive-wheel $o$ and its carrying-yoke $j$, when attached to the same short shaft $i$ which drives the separator, essentially as described, and for the purpose set forth.

2. The connection of the horizontal cog-wheel $l$ with the vertical armed separator $t$ of a potato-digger, by means of the projections $r$ and $s$ and cross-piece $q$, to allow the said pinion to turn half a revolution without turning the armed separator backward, as described.

In testimony whereof I have hereunto set my hand in the presence of two subscribing witnesses this 4th day of April, A. D. 1872.

ABRAM HEULINGS.

Witnesses:
A. E. H. JOHNSON,
J. W. HAMILTON JOHNSON.